United States Patent
Jun

[19]

[11] Patent Number: 6,128,704
[45] Date of Patent: Oct. 3, 2000

[54] CACHE DATARAM OF ONE PORT RAM CELL STRUCTURE

[75] Inventor: Sung Chun Jun, Kyoungki-do, Rep. of Korea

[73] Assignee: Hyundai Electronics Industries Co., Ltd., Ichon-shi, Rep. of Korea

[21] Appl. No.: 09/074,602

[22] Filed: May 8, 1998

[30] Foreign Application Priority Data

May 9, 1997 [KR] Rep. of Korea ...................... 97-18013

[51] Int. Cl.[7] .................................................. G06F 12/00
[52] U.S. Cl. ........................... 711/140; 711/3; 711/118; 711/154; 711/149
[58] Field of Search ............................. 711/3, 118, 140, 711/154, 167, 137, 149

[56] References Cited

U.S. PATENT DOCUMENTS

| | | |
|---|---|---|
| 5,025,421 | 6/1991 | Cho . |
| 5,117,493 | 5/1992 | Jensen ...................... 711/140 |
| 5,253,352 | 10/1993 | Olson ...................... 710/107 |
| 5,341,487 | 8/1994 | Derwin et al. ............ 711/146 |
| 5,353,424 | 10/1994 | Partovi et al. . |
| 5,509,137 | 4/1996 | Itomitsu et al. .......... 711/168 |
| 5,513,335 | 4/1996 | McClure . |
| 5,553,270 | 9/1996 | Rosenbluth .............. 711/169 |
| 5,557,768 | 9/1996 | Braceras et al. ......... 711/131 |
| 5,561,782 | 10/1996 | O'Connor ............... 711/140 |
| 5,590,309 | 12/1996 | Checinski et al. ....... 711/145 |
| 5,692,151 | 11/1997 | Cheong et al. .......... 711/140 |
| 5,790,822 | 8/1998 | Sheaffer et al. ......... 712/204 |

*Primary Examiner*—Tuan V. Thai
*Attorney, Agent, or Firm*—Jacobson, Price, Holman & Stern, PLLC

[57] ABSTRACT

The present invention provides a cache DataRam with one port ram cell configuration which improves the implemented area efficiency, performance and power savings. The cache DataRam of superscalar processor having multiple pipelines includes: a plurality of banks for multiple data access requests from the multiple pipelines, the plurality of banks forming into one port ram cell structure; a bank selection signal generation circuitry for generating a bank selection signal representing on which bank a data requested by the pipeline is located in response to address signals and control signals inputted from each pipeline for data access; a address selector for selecting an index address out of plurality of index addresses from the pipelines and outputting the selected index address as a valid pipeline index address in response to the bank selection signal; a decoder for decoding the valid pipeline index address for each bank; and a hitway selector for selecting a hitway signal out of hitway signals of the pipelines and outputting the selected hitway signal as a valid pipeline hitway signal, the hitway signals being generated by tag block for the each bank in response to the bank selection signal.

3 Claims, 6 Drawing Sheets

CACHE DATARAM OF ONE PORT RAM CELL STRUCTURE

BACKGROUND OF THE INVENTION

1. Field of the Invention

This invention relates to a microprocessor, and more particularly to a cache DataRam with improved area efficiency, performance and power savings of microprocessor.

2. Description of the Related Art

Generally, for a high performance microprocessor, a superscalar structure and accompanying multi-data accessible cache structure are essential. These cache covers about 50% of the microprocessor chip area, so compact and effective cache is required which still can support superscalar operation.

In the conventional superscalar microprocessor, two pipeline of the microprocessor check dependency on each other during operation. If no dependency is checked, each pipeline simultaneously requests data from cache.

FIG. 1 is a schematic diagram of a conventional cache DataRam 100 structure, of which an index address of X pipeline (XA [11:5]) 20 and an index address of Y pipeline (YA [11:5]) 21 are inputted to the corresponding pipeline address decoders 22 and 23. The index addresses 20 and 21 are respectively decoded by the address decoders 22 and 23. Memory cell arrays 24 and 24' of two port configuration are independently driven by corresponding decoded address signals. Then, cache lines having data of the memory cell arrays are simultaneously read by the driven sense amplifiers. After reading the data, valid way data is selected in response to hitway signals, i.e. X pipeline hitway [3:0] signal 25 and Y pipeline hitway [3:0] signal 25' generated by cache tag block (not shown). Then, the selected way data is sent to aligner block 26. In the aligner block 26, the read data in each pipeline is aligned by an X pipeline shifter 28 or Y pipeline shifter 28' of read path block 27 and sent to 4 byte X pipeline data bus or 4 byte Y pipeline data bus. Finally, the data is outputted to an execution unit or a command decoder unit.

As described above, the conventional cache DataRam has two port ram cell configuration 24 and 24', and includes decoders 22 and 23 dedicated to each pipeline (i.e. X and Y pipeline) and an aligner block 26 in order to solve simultaneous access through multiple pipelines. In designing 16 KB cache with 4 way set associative structure and 32 byte DataRam cache line entry, the block pitch in the conventional two port ram cell configuration is increased by thousands of micrometers ($\mu$m) in comparison with one port ram cell configuration. Also, in consideration of common data granularity, which is generally 4 bytes and required by each pipeline, the above described conventional data ram structure drives unnecessary cache lines. Further, although data sensing is independently performed on each pipeline so that different cache lines are accessed, since the whole cache lines are sensed repeatedly, the power consumption is very large.

SUMMARY OF THE INVENTION

Therefore, the present invention has been made in view of the above mentioned problem, and the present invention provides a cache DataRam with one port ram cell configuration which improves the implemented area efficiency, performance and power savings.

In accordance with the present invention, there is disclosed cache DataRam of superscalar processor having multiple pipelines including: a plurality of banks for multiple data access requests from the multiple pipelines, the plurality of banks forming into one port ram cell structure; a bank selection signal generation circuitry for generating a bank selection signal representing on which bank a data requested by the pipeline is located in response to address signals and control signals inputted from each pipeline for data access; a address selection means for selecting an index address out of plurality of index addresses from the pipelines and outputting the selected index address as a valid pipeline index address in response to the bank selection signal; a decoding means for decoding the valid pipeline index address for each bank; and a hitway selection means for selecting a hitway signal out of hitway signals of the pipelines and outputting the selected hitway signal as a valid pipeline hitway signal, the hitway signals being generated by tag block for the each bank in response to the bank selection signal.

BRIEF DESCRIPTION OF THE DRAWINGS

A further understanding of the nature and advantage of the present invention will become apparent by reference to the remaining portions of the specification and drawings, in which.

DETAILED DESCRIPTION OF THE PREFERRED EMBODIMENT

A detailed description of an embodiment according to the present invention will be given below with reference to FIG. 2.

Figure 1:
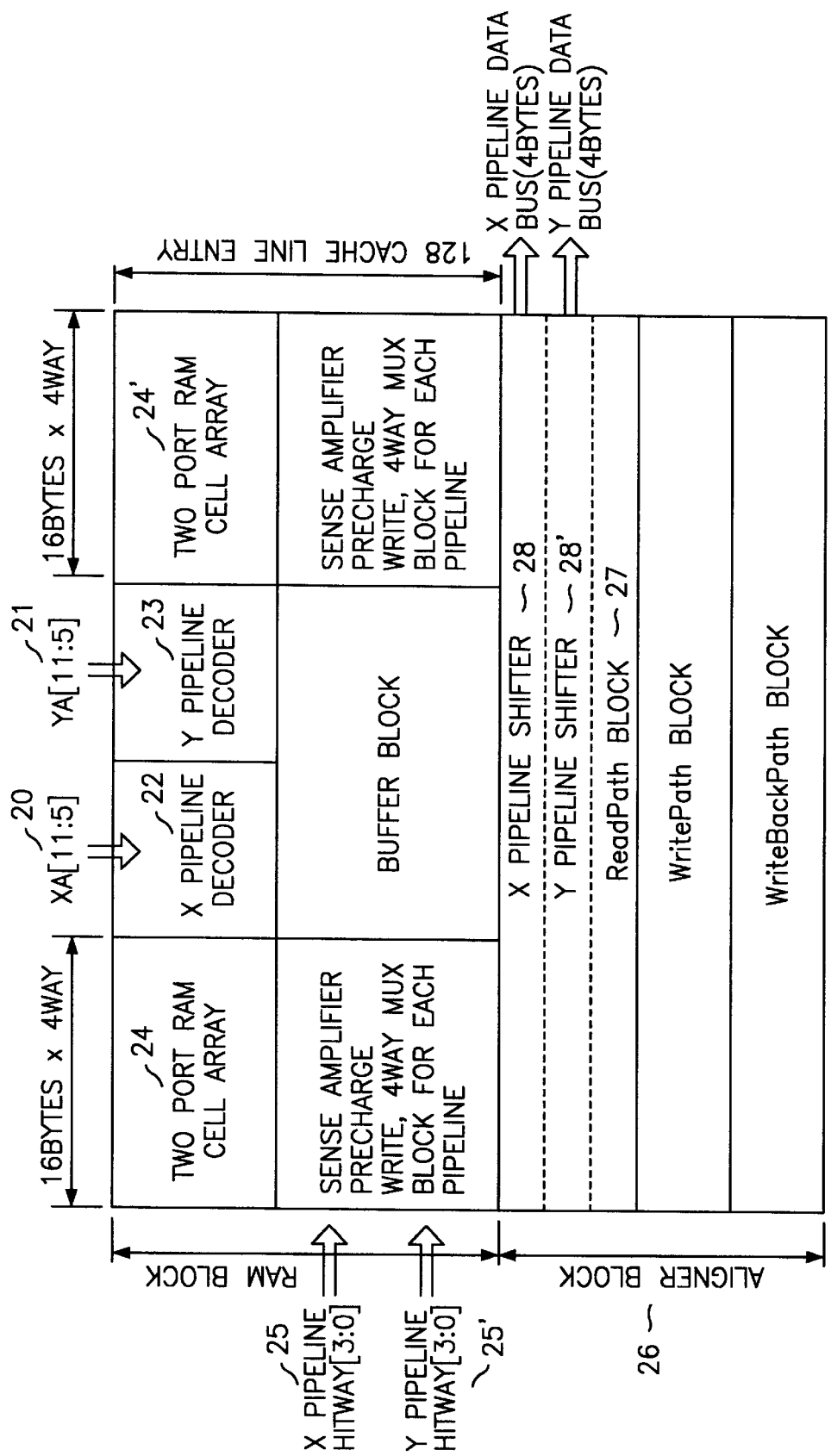
FIG. 1 is a schematic diagram of a conventional cache DataRam structure.
Figure 2:
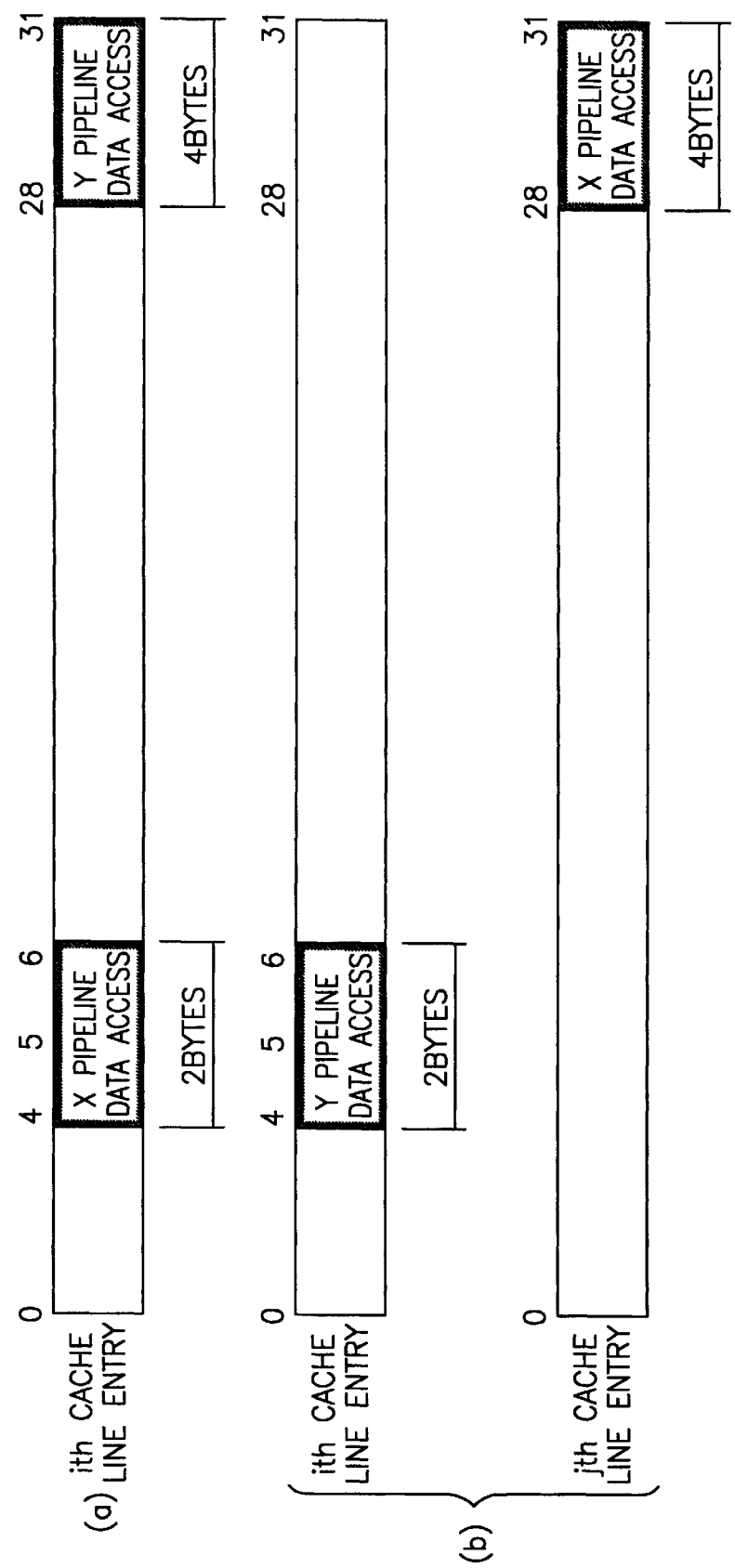
FIG. 2 is a schematic diagram showing the concept of data conflict in pipeline data access.

Referring to FIG. 2, FIG. 2 is a schematic diagram showing the concept of data conflict in pipeline data access. Almost all of the data access of each pipeline are either the data access requesting the data located at different portion of a specific cache line entry (i-th cache line entry) simultaneously (case (a)), or the data access requesting the data located at different cache line entries (i-th and j-th cache line entry) simultaneously (case (b)).

Therefore, the probability of the data conflict, which means the data access requesting the data located at the same portion of a specific cache line entry, is very low.

The present invention makes use of the low probability of data conflict and the fact that the granularity of the data access in each pipeline of the superscalar processor does not exceed 4 bytes in most cases. Therefore, it is possible to divide a cache line entry into several banks, each of which is 4 bytes in size, and to determine at which bank the requested data is located, so that the data access at each bank is separately processed in one CPU clock cycle.

Figure 3:
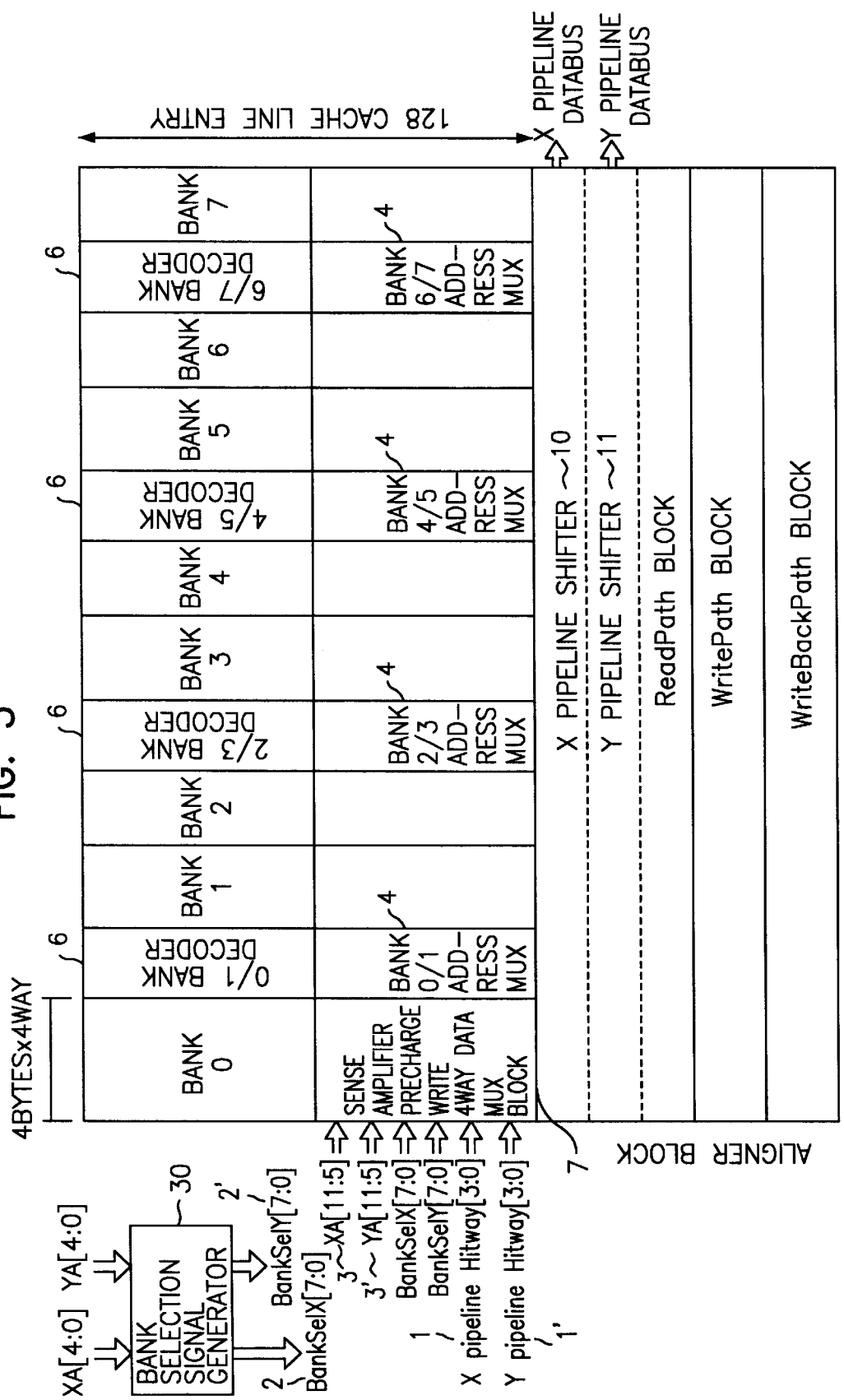
FIG. 3 is a schematic diagram of a cache DataRam structure according to the present invention.

FIG. 3 is a schematic diagram of a cache DataRam structure according to the present invention which includes 32-byte cache line entry divided by 4-byte unit. The cache DataRam of FIG. 3 includes 8 banks, a bank selection signal generator 30 which generates bank selection signals BankSelX [7:0] 2 and BankSelY [7:0] 2' in response to address signals XA [4:0] and YA [4:0] inputted from each pipeline, a plurality of address multiplexers 4 which select pipeline addresses out of pipeline addresses XA [11:5] 3 and YA [11:5] 3' in response to the bank selection signals 2 and 2', a plurality of bank decoders 6 which decode pipeline addresses from the address multiplexers 4 and a hitway multiplexer 7 which generates valid pipeline hitway signal in response to the bank selection signals 2 and 2' on receiving tag hitways of X pipeline Hitway [3:0] 1 and Y pipeline Hitway [3:0] 1' on each pipeline.

The bank selection signals 2 and 2' of the bank selection signal generator 30 represent that on which bank the requested data is located. Each address multiplexer 4 is shared by adjacent 2 banks, respectively. And each bank decoder 6 is also shared by adjacent 2 banks, respectively.

As shown in FIG. 3, the present invention is applicable to a cache of a microprocessor having X and Y pipelines. The basic specification of the cache is 16 Kilo-Bytes (KB) in size and having 4 way set associative structure. 128 cache line entries in total are included in the cache, wherein each cache line entry is 32 bytes in size and divided into 8 portions each of which is 4 bytes in size.

Figure 4:
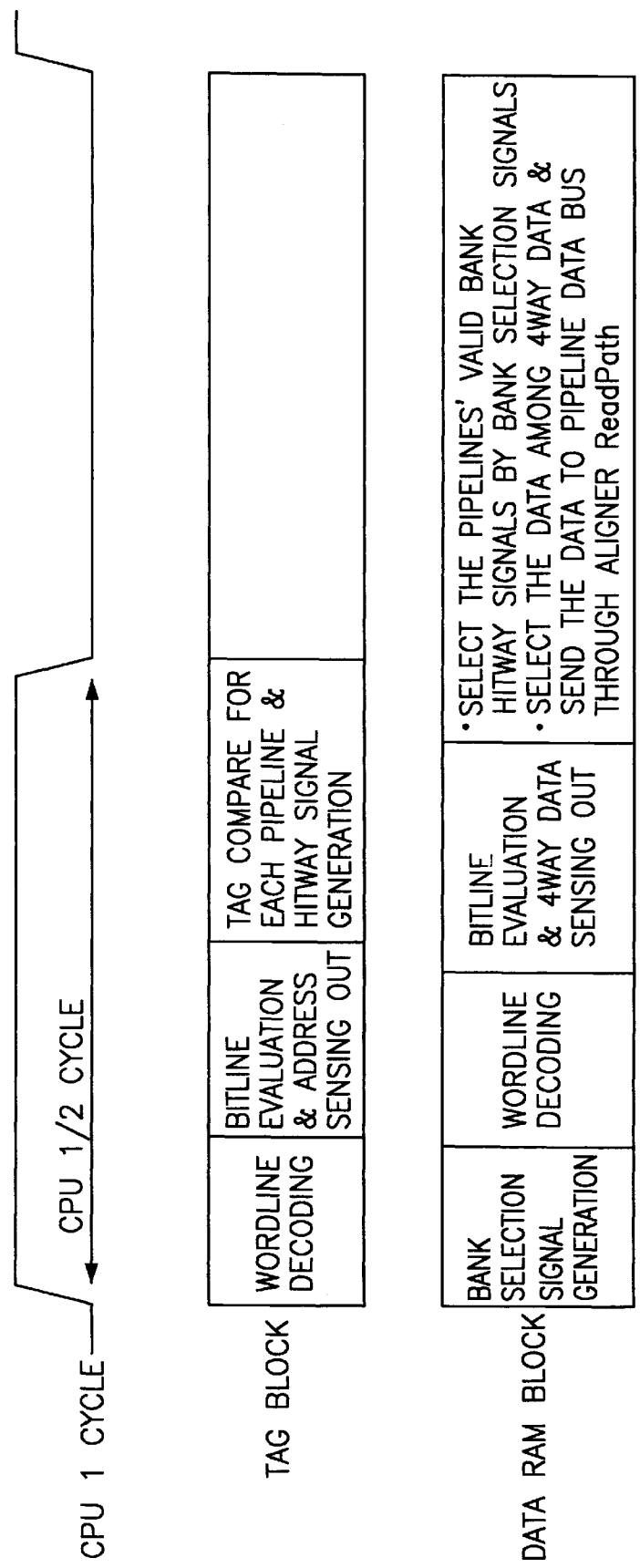
FIG. 4 is a timing diagram of cache micro-operation of the cache DataRam of FIG. 3.

FIG. 4 is a timing diagram of cache micro-operation of the cache DataRam of FIG. 3. The cache micro-operation is performed in 2 parts.

During a first half of a central processing unit ("CPU") cycle, an upper tag A [31:12] of 20 bits of each address for the data requested by each pipeline is compared to a tag entry of the tag block selected by decoding a lower set index A [11:5] of each of the addresses, thereby the Hitways 1 and 1' are generated and sent to the DataRam. And, after the bank selection signals 2 and 2' are generated by the bank selection signal generator 30 (refer to FIG. 5), the valid pipeline address signal A [11:5] 5 is selected out of X pipeline address XA [11:5] 3 and Y pipeline address YA [11:5] 3' in response to the bank selection signals 2 and 2' by the address multiplexer 4. The selected address signal A [11:5] 5 is sent to the bank decoder 6. After the wordline decoding of the bank decoder, the 4 way data is sensed by the sense amplifier.

Figures 6, 7:
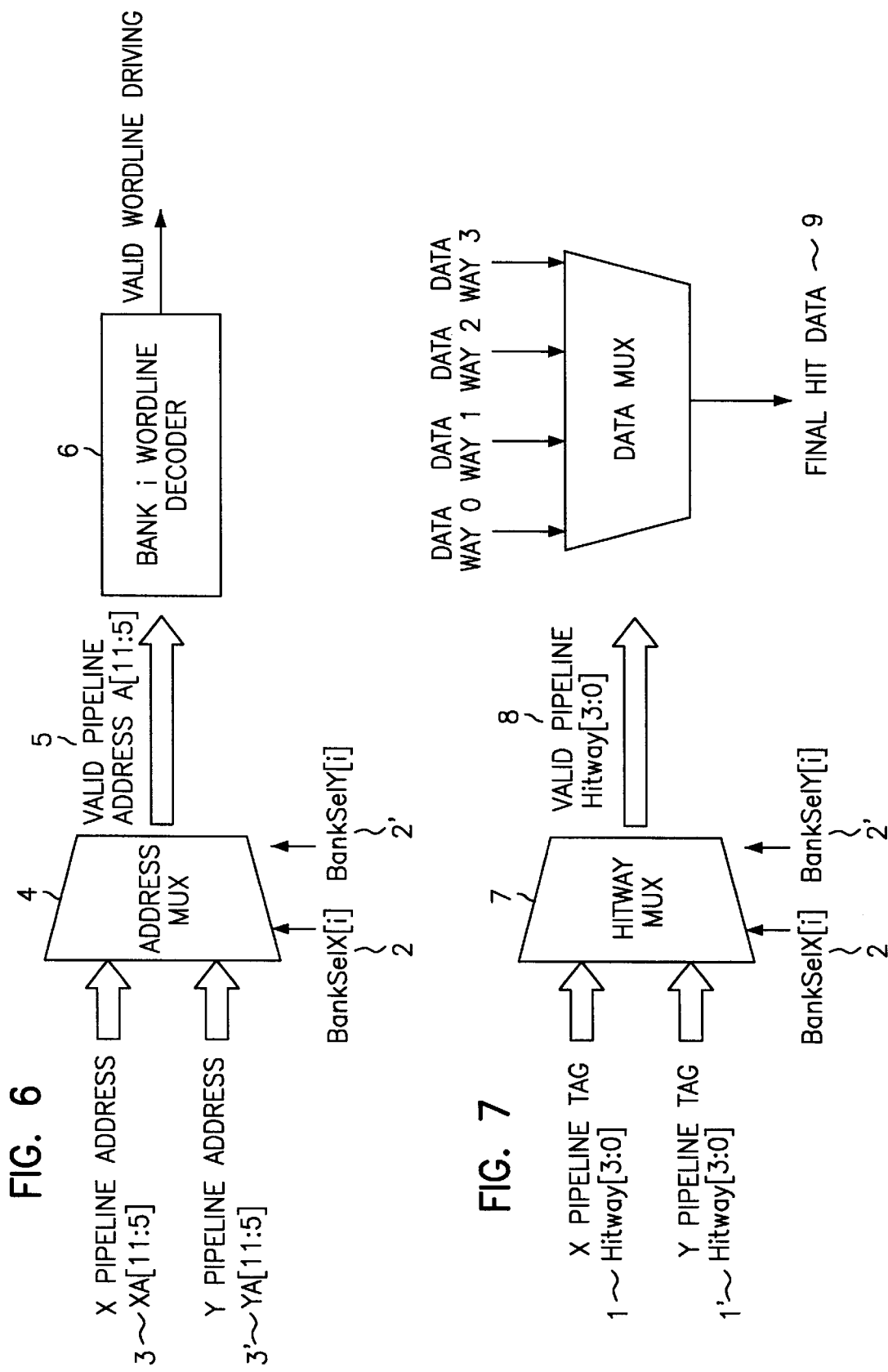
FIG. 6 is a schematic block diagram of a valid pipeline address multiplexer and word line decoder of i-th bank.
FIG. 7 is a schematic block diagram of a valid hitway multiplexer and output data multiplexer of i-th bank.

Referring now to FIG. 7 and FIG. 3, during the second half of the CPU cycle, the valid pipeline hitway 8 is selected out of the X and Y pipeline hitways 1 and 1' which are generated by the tag block with the bank selection signals 2 and 2', and a final data 9 is selected out of the 4 way data which are sensed out during the first half of the CPU cycle.

An X pipeline shifter 10 of the aligner block 26 determines the starting point of the bank, which is accessed by the X pipeline, by decoding the XShiftPointer XA [4:0], so that the final data 9 is shifted and outputted to X pipeline databus of 4-byte bus width. Further, an Y pipeline shifter 11 of the aligner block 26 determines the starting point of the bank, which is accessed by the Y pipeline, by decoding the YShiftPointer YA [4:0], so that the final data 8 is shifted and outputted to Y pipeline databus of 4-byte bus width.

Figure 5:
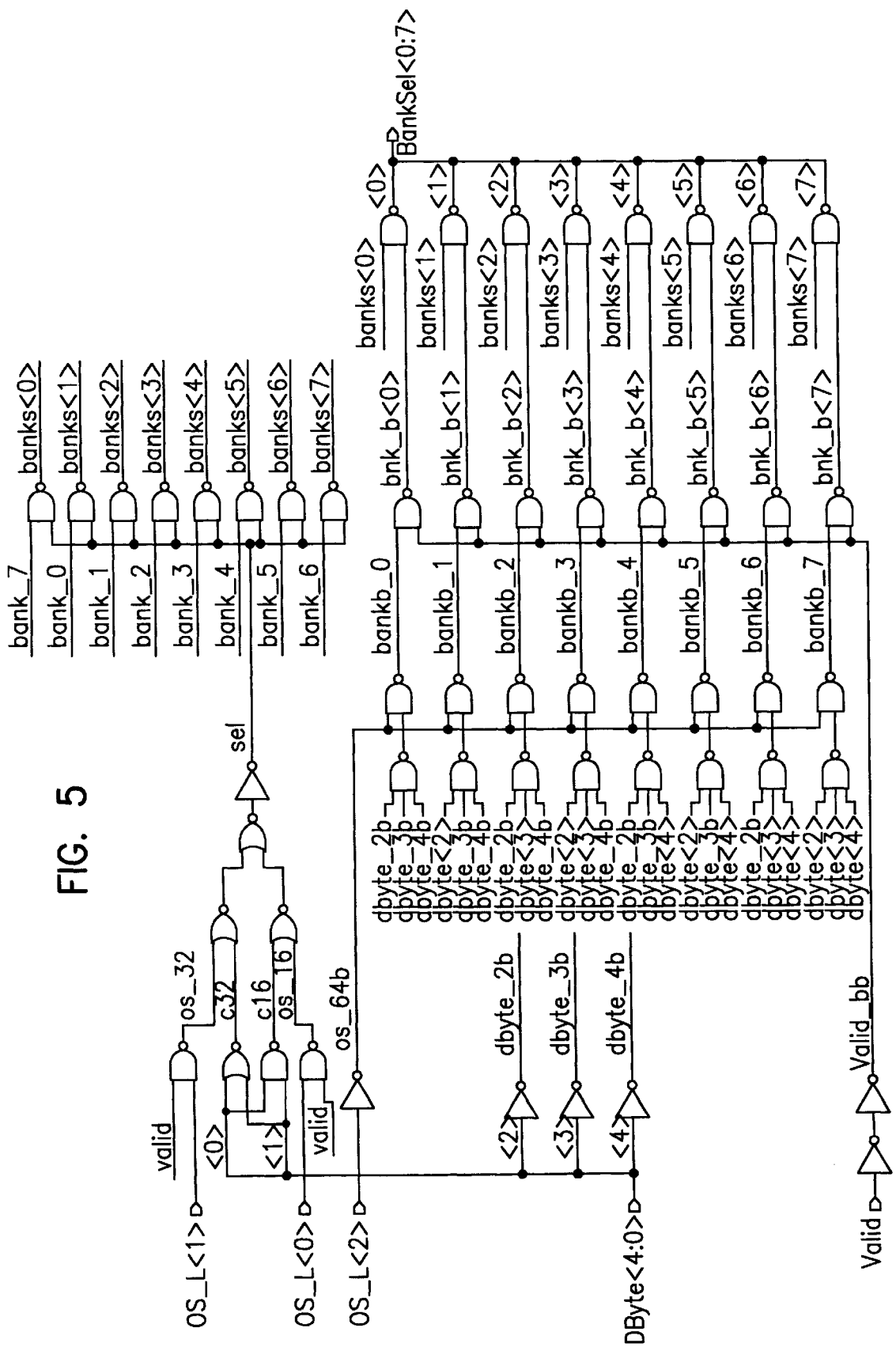
FIG. 5 is a detailed circuit diagram of a bank selection signal generating circuit.

Now, referring to FIG. 5, FIG. 5 is a detailed circuit diagram of a bank selection signal generating circuit. As shown in FIG. 5, the bank selection signal generator 30 determines the size of each requested data in each pipeline, the lower address bit XA [4:0] or YA [4:0] of each pipeline and which bank is accessed by each pipeline in response to the valid operation signal. The bank selection signal generator is described by hardware description language ("HDL"), such as Verilog and is as follows;

```
code 1
module BankSel(
    DByte,
    OS_L,
    Valid,
    BankSel
);
input    [4:0]  DByte;
input    [2:0]  OS_L;
input           Valid;
output   [7:0]  BankSel;
wire     [7:0]  BankSel;
wire     [7:0]  bank_b;
wire            os64;
wire            os32;
wire            os16;
wire            c32;
wire            c16;
assign os64 = (OS_L[2] == 1'b1);
assign os32 = (OS_L == 3'b011 || OS_L == 3'b010);
assign os16 = (OS_L == 3'b001);
assign bank_b[7] = Valid & ((DByte[4:2] == 3'b111) | os64);
assign bank_b[6] = Valid & ((DByte[4:2] == 3'b110) | os64);
assign bank_b[5] = Valid & ((DByte[4:2] == 3'b101) | os64);
assign bank_b[4] = Valid & ((DByte[4:2] == 3'b100) | os64);
assign bank_b[3] = Valid & ((DByte[4:2] == 3'b011) | os64);
assign bank_b[2] = Valid & ((DByte[4:2] == 3'b010) | os64);
assign bank_b[1] = Valid & ((DByte[4:2] == 3'b001) | os64);
assign bank_b[0] = Valid & ((DByte[4:2] == 3'b000) | os64);
assign c32 = DByte [1] | DByte[0];
assign c16 = DByte [1] & DByte[0];
assign BankSel[7] = bank_b[7] | bank_b[6]&os32&c32 | bank_b[6]&os16&c16;
assign BankSel[6] = bank_b[6] | bank_b[5]&os32&c32 | bank_b[5]&os16&c16;
assign BankSel[5] = bank_b[5] | bank_b[4]&os32&c32 | bank_b[4]&os16&c16;
assign BankSel[4] = bank_b[4] | bank_b[3]&os32&c32 | bank_b[3]&os16&c16;
assign BankSel[3] = bank_b[3] | bank_b[2]&os32&c32 | bank_b[2]&os16&c16;
assign BankSel[2] = bank_b[2] | bank_b[1]&os32&c32 | bank_b[1]&os16&c16;
assign BankSel[1] = bank_b[1] | bank_b[0]&os32&c32 | bank_b[0]&os16&c16;
assign BankSel[0] = bank_b[0] | bank_b[7]&os32&c32 | bank_b[7]&os16&c16;
endmodule
```

DByte corresponds to the lower address bit XA[4:0] or YA[4:0] of each pipeline, OS_L is a control signal representing size of a data requested by a pipeline and Valid is a control signal which checks the validity of the pipeline operation as a whole. BankSel[7:0] is the output signal of the bank selection signal generator 30 representing which bank out of 8 banks is accessed by the pipeline. Each pipeline first activates a bank where the data initiates with DByte[4:2], and then determines the starting point of the bank and whether the adjacent bank would be activated based on the size of the data. Finally, after checking conflict of each pipeline bank access, if there is a conflict, the pipeline having priority is allowed to access the bank.

Although the preferred embodiment of the present invention has been disclosed for illustrative purposes, those skilled in the art will appreciate that various modifications, additions and substitutions are possible, without departing from the scope and the spirit of the present invention as disclosed in the accompanying claims.

What is claimed is:

1. A cache DataRam of superscalar processor having multiple pipelines comprising:

a plurality of banks for multiple data access requests from said multiple pipelines, said plurality of banks forming into one port ram cell structure;

a bank selection signal generation circuitry for generating a bank selection signal representing on which bank a data requested by said pipeline is located in response to address signals and control signals inputted from each pipeline for data access;

an address selection means for selecting an index address out of plurality of index addresses from said pipelines and outputting said selected index address as a valid pipeline index address in response to said bank selection signal;

a decoding means for decoding said valid pipeline index address for each bank; and a hitway selection means for selecting a hitway signal out of hitway signals of said pipelines and outputting said selected hitway signal as a valid pipeline hitway signal, said hitway signals being generated by tag block for said each bank in response to said bank selection signal;

wherein said control signal represents a size of said data requested by said each pipeline, a lower portion of said address signal of said pipeline and a validity of the pipeline operation.

2. A cache DataRam as claimed in claim 1, wherein said address selection means includes a number of bank address multiplexers, each bank address multiplexer being shared by two adjacent banks.

3. A cache DataRam as claimed in claim 1, wherein said decoding means includes a number of bank decoders, each bank decoder being shared by two adjacent banks.

* * * * *